US006860191B2

(12) United States Patent
Jackson et al.

(10) Patent No.: US 6,860,191 B2
(45) Date of Patent: Mar. 1, 2005

(54) WAFFLE BAKER

(75) Inventors: David Lee Jackson, Mechanicsville, VA (US); Jeffrey Thomas Mauch, Mechanicsville, VA (US); Xiaogang Guo, Greenburg, PA (US)

(73) Assignee: Hamilton Beach/Procter-Silex, Inc., Glen Allen, VA (US)

( * ) Notice: Subject to any disclaimer, the term of this patent is extended or adjusted under 35 U.S.C. 154(b) by 135 days.

(21) Appl. No.: 10/211,405

(22) Filed: Aug. 2, 2002

(65) Prior Publication Data

US 2004/0020370 A1 Feb. 5, 2004

(51) Int. Cl.$^7$ .......................... A47J 37/00; A47J 37/06; A47J 37/08; A23L 1/00; H05B 3/06
(52) U.S. Cl. ........................... 99/340; 99/372; 99/374; 99/375; 99/377; 99/379; 99/380
(58) Field of Search .................. 99/326–333, 340–342, 99/343, 344, 372–384, 385, 400, 389–391, 401, 444–446; 219/521–525, 537, 492, 494, 497, 450.1, 451.4, 446.1, 538, 451.1; 426/523, 501, 138, 514, 441, 442

(56) References Cited

U.S. PATENT DOCUMENTS

| | | | |
|---|---|---|---|
| 246,194 A | * | 8/1881 | Patton .......................... 99/377 |
| 2,134,026 A | | 10/1938 | Brooks |
| 3,799,047 A | * | 3/1974 | Freeman ....................... 99/332 |
| D237,935 S | | 12/1975 | Nygren |
| 4,091,720 A | | 5/1978 | Wheeler |
| 4,163,418 A | | 8/1979 | Thelander |
| 4,386,557 A | | 6/1983 | Meraj et al. |
| 4,476,379 A | | 10/1984 | Andrizzi |
| 4,803,918 A | * | 2/1989 | Carbon et al. ................. 99/377 |
| 4,817,510 A | * | 4/1989 | Kowalics et al. ............. 99/331 |
| 4,913,038 A | * | 4/1990 | Burkett et al. ................ 99/331 |
| 4,919,965 A | | 4/1990 | Childers, Jr. |
| D309,549 S | | 7/1990 | Stephens |
| 4,970,949 A | * | 11/1990 | Ferrara et al. ................. 99/374 |
| D347,548 S | | 6/1994 | Boehm et al. |
| D373,452 S | | 9/1996 | Gobble et al. |

(List continued on next page.)

OTHER PUBLICATIONS

Frozen Waffles—Waffles of Oklahoma, Beck's Waffles of Oklahoma, Shawnee, Oklahoma, Mar. 2, 2001, published via the Internet, http://www.okwaffles.com, obtained from http://archive.org.

Waffles of Oklahoma, Shawnee, Oklahoma, Nov. 9, 2000, published via the Internet, http://www.okwaffles.com, obtained from http://archive.org.

Becks Waffles—Products, Beck's, Shawnee, Oklahoma, Nov. 9, 2000, published via the Internet, http://www.ok-waffles.com, obtained from http://archive.org.

Internet Archive Wayback Machine, http://webarchive.org/seb/*/www.okwaffles.com, undated.

Primary Examiner—Timothy F. Simone
(74) Attorney, Agent, or Firm—Akin Gump Strauss Hauer & Feld, L.L.P.

(57) ABSTRACT

A waffle baker grill for producing a waffle product, including a first heating plate having a first surface and a first peripheral wall extending from the first surface to a predetermined distance. The first peripheral wall includes a first side and a second side. A second heating plate has a second surface and a second peripheral wall extending from the second surface to the predetermined distance. The second peripheral wall includes at least a third side and a fourth side. The second heating plate is pivotally connected to the first heating plate to move between a closed position and an open position. The first and second surfaces include at least one scoring flange extending to a distance less than the predetermined distance. The waffle produced from the grill may be divided into a plurality of waffle sticks along score lines created by the scoring flanges.

7 Claims, 3 Drawing Sheets

U.S. PATENT DOCUMENTS

| | | |
|---|---|---|
| D376,037 S | 12/1996 | Gluszak et al. |
| 5,596,922 A | 1/1997 | Chan |
| 5,636,564 A * | 6/1997 | Weiss ........................ 99/332 |
| 5,671,658 A | 9/1997 | Macasaet |
| D392,153 S | 3/1998 | Wright |
| D407,598 S | 4/1999 | Deni et al. |
| D409,048 S | 5/1999 | Verkinderen |
| D409,876 S | 5/1999 | Gruaz |
| 5,937,742 A * | 8/1999 | Steeb et al. .................. 99/375 |
| 5,983,784 A | 11/1999 | Goldberg |
| D417,766 S | 12/1999 | Sherman et al. |
| 6,044,755 A | 4/2000 | Misceo |
| 6,092,459 A | 7/2000 | Zhang |
| 6,150,635 A * | 11/2000 | Hannon et al. ............. 219/386 |
| D437,727 S | 2/2001 | Gruaz |
| D440,737 S | 4/2001 | Johnson et al. |
| 6,397,730 B1 * | 6/2002 | Steinbach et al. ............ 99/331 |
| 6,412,400 B1 * | 7/2002 | Gambino et al. ............. 99/375 |
| 6,429,409 B1 * | 8/2002 | Siu ........................ 219/450.1 |
| 6,487,963 B1 * | 12/2002 | Wu ............................ 99/340 |

\* cited by examiner

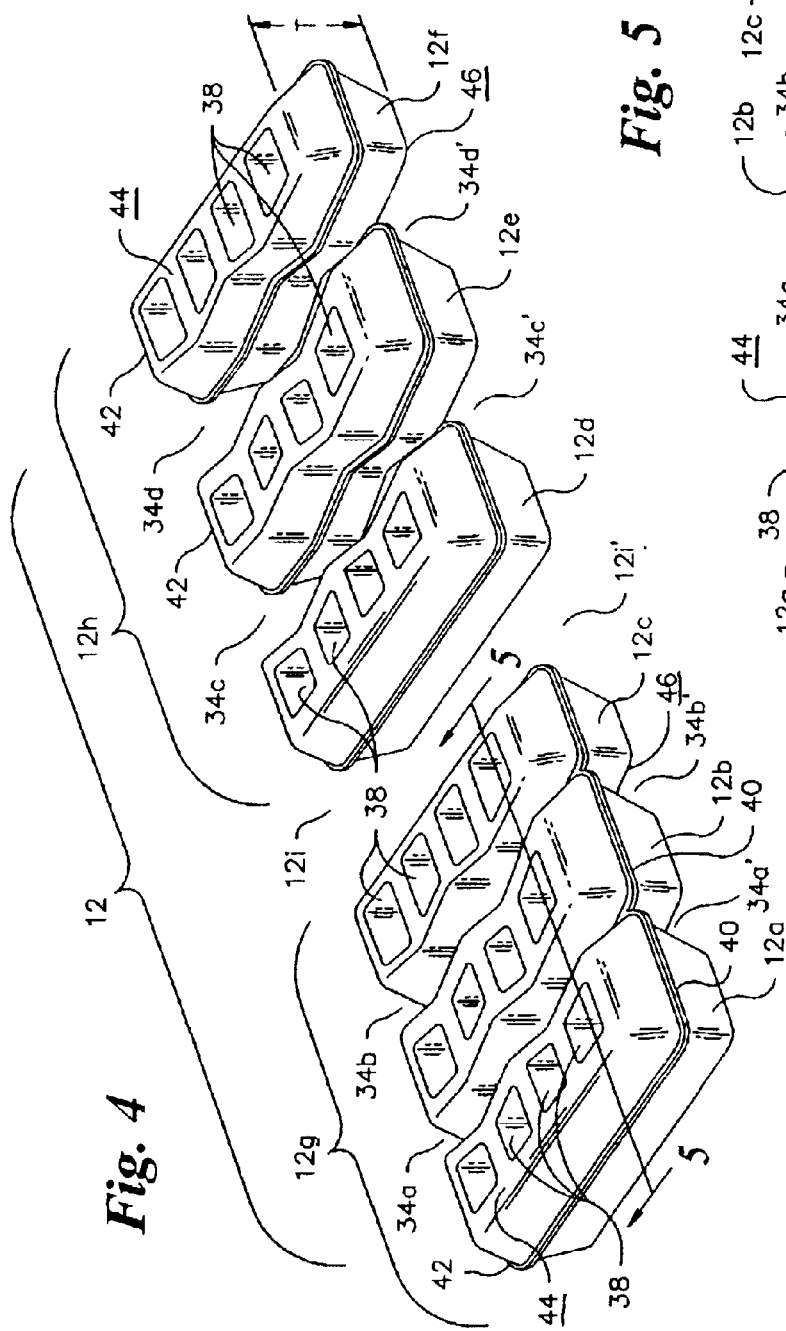

WAFFLE BAKER

BACKGROUND OF THE INVENTION

The present invention is directed to a waffle baker grill for producing a waffle including a first heating plate, a second heating plate and at least one scoring flange. The waffle baker grill produces waffles that may be divided into a plurality of waffle sticks along scoring lines created by the scoring flanges.

The general concept of producing waffles using a pair of heating plates that are pivotally connected to each other is generally well known. The heating plates of a conventional waffle baker are heated to a predetermined temperature, batter is disposed onto one of the heating plate surfaces and a second heating plate is positioned adjacent to the first heating plate to heat and cook the batter. The batter is cooked for a predetermined amount of time to produce a waffle. It is well known to include walls and mounds on the heating plates that contain the batter, define a peripheral shape of the waffle and create wells on various surfaces of the waffle. Conventional waffle bakers generally produce rounded or rectangular shaped waffles that are removed from the heating plates for consumption. Such conventional waffles have generally flat upper and lower surfaces with an array of wells for receiving syrup or other condiments. Conventional waffles are not readily separable into discrete smaller waffles by hand. That is, conventional waffles can only be readily separated into evenly divided discrete small waffles using cutting utensils.

In view of the increasing demand for new, innovative food products for the commercial food market and home use, methods and apparatus for obtaining different types of food products become increasingly desirable. For instance, there is a need for a waffle baker that can produce waffles that are readily separated into discrete smaller waffles or waffle sticks by hand.

The waffle baker grill of the present invention includes a series of scoring flanges that protrude from surfaces of the first and second heating plate surfaces, which produce scoring lines on surfaces of a cooked waffle. These scoring lines may be used to divide the cooked waffle into a plurality of convenient to use waffle sticks. These waffle sticks are easily manipulated using a single hand and may be dipped into a condiment, such as maple syrup, chocolate or sugar, for consumption. Moreover, the waffle baker grill of the present invention also discloses a waffle product that may be divided into sub-waffles or a plurality of waffle sticks. Accordingly, the waffle baker grill of the present invention provides flexibility to a user, in that, the waffle product produced by the waffle baker grill may be used to produce waffles that may be divided by hand into sub-waffles or separated by hand into a plurality of easy to manipulate and consume waffle sticks.

BRIEF SUMMARY OF THE INVENTION

Briefly, the present invention is directed to a waffle baker grill for producing a waffle product. The waffle baker grill includes a first heating plate having a first surface and a first peripheral wall extending from the first surface to a predetermined distance. The first peripheral wall includes at least a first side and a second side. A second heating plate includes a second surface and a second peripheral wall extending from the second surface to the predetermined distance. The second peripheral wall has at least a third side and a fourth side. The second heating plate is pivotally connected to the first heating plate to move between a closed position where the first and second peripheral walls are adjacent to each other and an open position wherein the first and second peripheral walls are spaced from each other. At least one scoring flange extends from each of the first and second surfaces to a distance less than the predetermined distance between the first and second sides and the third and fourth sides, respectively. The waffle product produced from the waffle baker grill may be divided into a plurality of waffle sticks along score lines created by the scoring flanges.

In another aspect, the present invention is directed to a waffle product produced from disposing batter between two heating plates and heating the batter for a predetermined amount of time. The waffle product is comprised of a body of the cooked batter having a first edge, a second edge, a first waffle surface, a second waffle surface and a predetermined thickness measured between the first and second waffle surfaces. The waffle product includes a plurality of opposing scoring lines, each having a depth less than half the predetermined thickness traversing the first and second waffle surfaces from the first edge to the second edge. The scoring lines on the first waffle surface are aligned with the scoring lines on the second waffle surface such that the waffle body is separable into a plurality of waffle sticks along the scoring lines.

BRIEF DESCRIPTION OF THE SEVERAL VIEWS OF THE DRAWINGS

The foregoing summary, as well as the following detailed description of preferred embodiments of the invention will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings:

FIG. 4 is an enlarged top perspective view, partially exploded, of a waffle product produced from the waffle baker grill shown in FIG. 1; and FIG. 5 is a cross-sectional view of the sub-waffle of the waffle product shown in FIG. 4 taken along line 5—5 of FIG. 4.

DETAILED DESCRIPTION OF THE INVENTION

Figure 1:
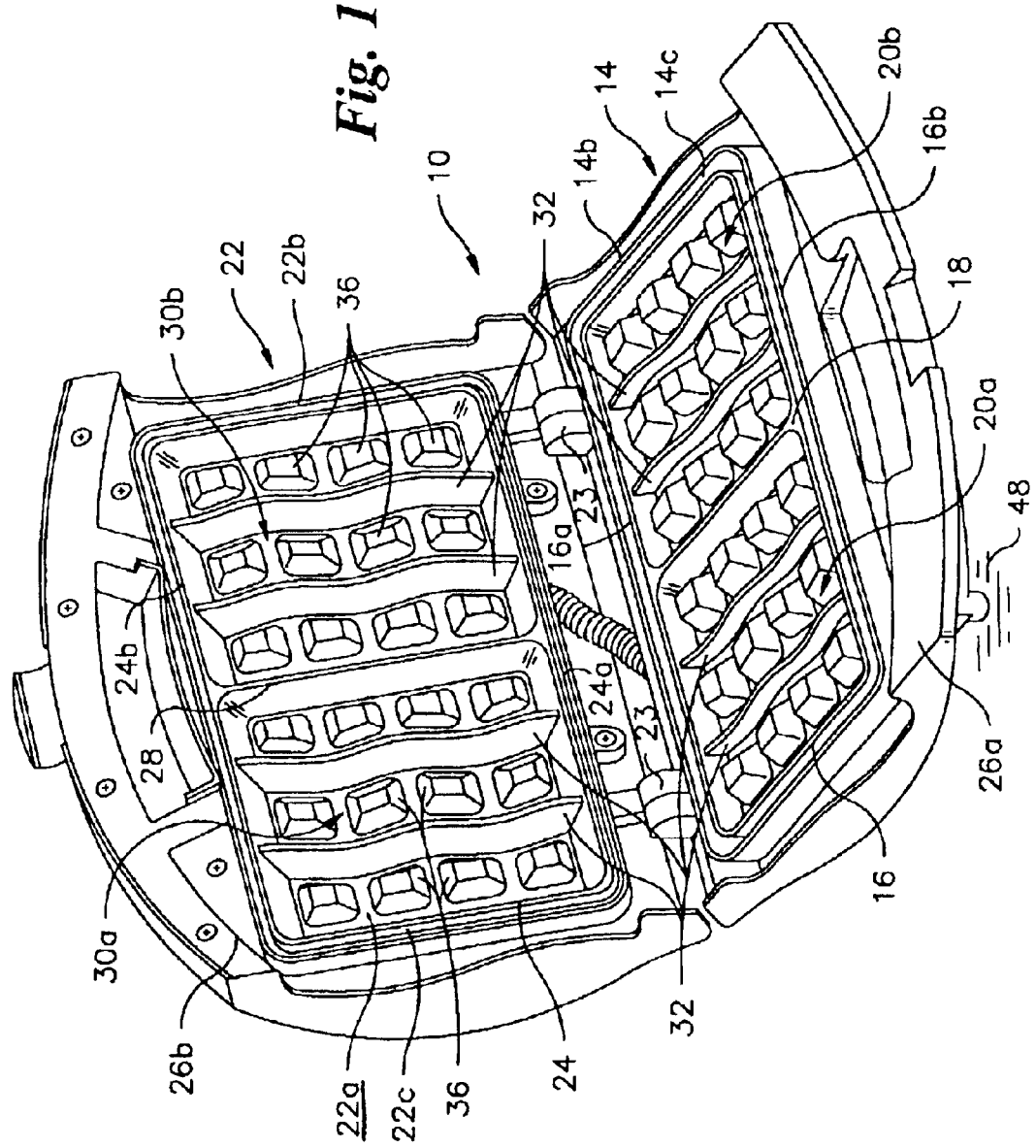
FIG. 1 is a front perspective view of the waffle baker grill in the open position in accordance with a preferred embodiment of the present invention.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the waffle baker grill, the waffle product and designated parts thereof. The terminology includes the words above specifically mentioned, derivatives thereof and words of similar import.

Figure 2:
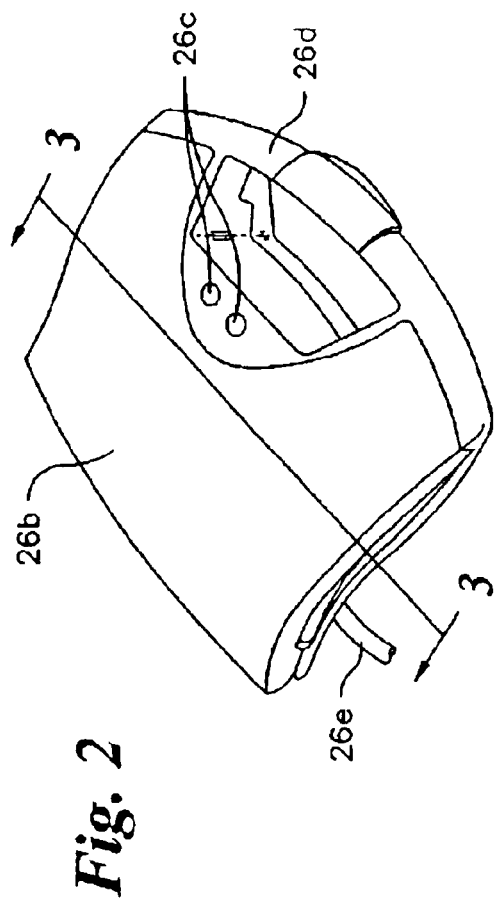
FIG. 2 is a top perspective view of the waffle baker grill shown in FIG. 1 in the closed position.
Figure 3:
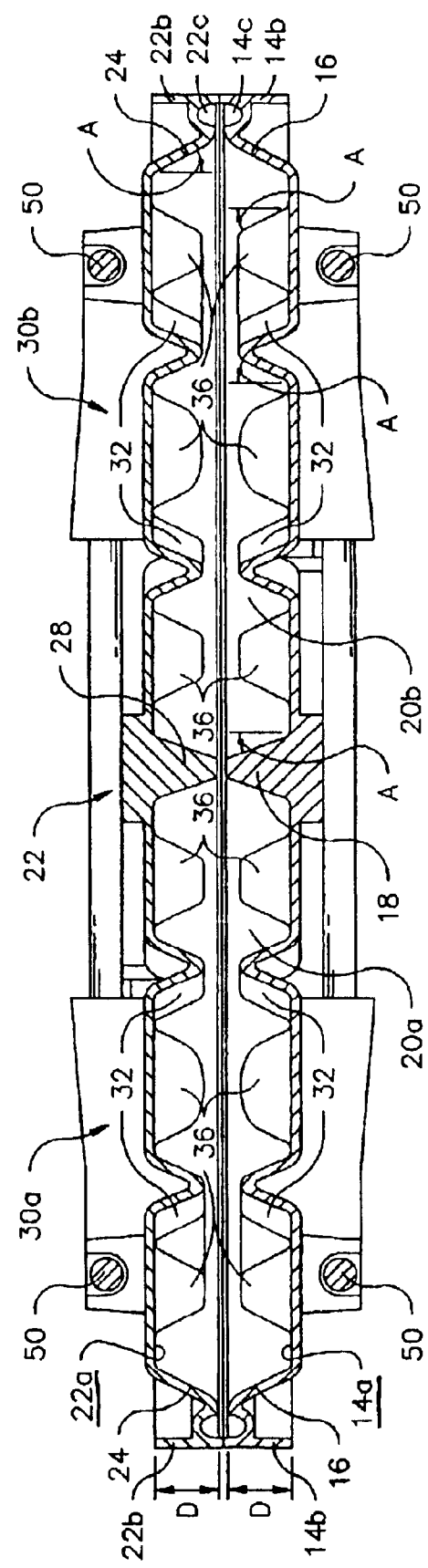
FIG. 3 is an enlarged cross-sectional view of the waffle baker grill shown in FIG. 2 taken along line 3—3 of FIG. 2.

Referring to the drawings in detail, wherein like numerals indicate like elements throughout, there is shown in FIGS. 1 through 3, a preferred embodiment of a waffle baker grill, generally designated 10, for producing a preferred waffle product 12 that is separable by hand into sub-waffles 12g and 12h, as shown in FIGS. 4–5, in accordance with the present invention.

Referring to FIGS. 1–3, in the preferred embodiment, the waffle baker grill 10 includes a first heating plate 14 having a first surface 14a and a peripheral wall 16 extending from the first surface 14a to a predetermined distance D. The predetermined distance D is approximately but not limited to five to fourteen millimeters in the preferred embodiment. The first peripheral wall 16 includes at least a first side 16a and second side 16b. It is preferred that the first heating plate 14 further include a first protrusion 18 extending from the first surface 14 to the predetermined distance D between the first and second sides 16a, 16b. The first protrusion 18 creates a first cavity 20a and a second cavity 20b between the first protrusion 18 and the first peripheral wall 16. In the preferred embodiment, the first protrusion 18 extends generally perpendicularly between the first and second sides 16a, 16b. However, the waffle baker grill 10 is not limited to such a configuration of the first protrusion 18 or even the inclusion of a first protrusion 18. For example, the first heating plate 14 may simply include a generally circular first peripheral wall 16 including a first side 16a and a second side 16b that border a single cavity (not shown).

In the preferred embodiment, the waffle baker grill 10 further includes a second heating plate 22 having a second surface 22a and a second peripheral wall 24 extending from the second surface 22a to the predetermined distance D. The second peripheral wall 24 includes at least a third side 24a and a fourth side 24b. The second heating plate 22 is pivotally connected to the first heating plate 14 by hinges 23, which permit the first and second heating plates 14, 22 to move between a closed position (see FIGS. 2 and 3) wherein the first and second peripheral walls 16, 24 are adjacent to each other and an open position (see FIG. 1) wherein the first and second peripheral walls 16, 24 are spaced from each other. It is preferred that the hinges 23 not only permit pivotal movement between the first and second heating plates 14, 22 but also permit generally linear movement between the first and second heating plates 14, 22 in the closed position. That is, the second heating plate 22 may move in a direction away from the first heating plate 14 from the closed position such that the first and second surfaces 14a, 22a are generally parallel to each other throughout the movement. The inclusion of hinges 23 that permit pivotal as well as generally planar linear movement of the first and second heating plates 14, 22 relative to each other is understood by those of ordinary skill in the art and is not pertinent to the present invention. The first and second heating plates 14, 22 need not be directly pivotally secured to each other but may be secured to a first housing section 26a and a second housing section 26b that are in turn pivotally secured to each other with hinges similar to those described above. Further, one having ordinary skill in the art will realize that the first and second heating plates 14, 22 need not be pivotally secured to each other at all to function properly, as long as the first and second heating plates 14, 22 may be positioned relative to each other as described above in both the closed and open positions. For example, the first and second heating plates 14, 22 may not be secured to each other at all and may be positionable by a user in either of the open or closed positions by hand.

It is preferred that the second heating plate 22 further include a second protrusion 28 extending from the second surface 22a to the predetermined distance D. In this embodiment, the second protrusion 28 extends between the third and fourth sides 24a, 24b of the second peripheral wall 24. The second protrusion 28 creates a third cavity 30a and a fourth cavity 30b between the second protrusion 28 and the second peripheral wall 24. It is also preferred that the second protrusion 28 extend generally perpendicularly between the third and fourth sides 24a, 24b. This configuration is generally equivalent to the configuration described above including the first protrusion 18, first cavity 20a, second cavity 20b, first side 16a and second side 16b for the first heating plate 14. Similarly, the second heating plate 22 is not limited to the use of the second protrusion 28, third cavity 30a, fourth cavity 30b, third side 24a and fourth side 24b. The second heating plate 22 is able to operate effectively in the waffle baker grill 10 of the present invention without the inclusion of the second protrusion 28, third cavity 30a and fourth cavity 30b. In addition, the first and second heating plates 14, 22 will function with nearly any sized first and second peripheral walls 16, 24 so long as the first and second heating plates 14, 22 have complementary shapes. Similarly, the second protrusion 28 is not limited to the perpendicular arrangement and will function regardless of which angle is chosen between the third and fourth sides 24a, 24b and the second protrusion 28.

The waffle baker grill 10 of the present invention further includes at least one scoring flange 32 extending from each of the first and second surfaces 14a, 22a to a distance less than the predetermined distance D between the first and second sides 16a, 16b and the third and fourth sides 24a, 24b, respectively. In the preferred embodiment, the scoring flanges 32 traverse the first and second surfaces 14a, 22a along a generally sine-wave shaped path. However, it will be understood by those of ordinary skill in the art from this disclosure that the scoring flanges 32 could traverse the first and second surfaces 14a, 22a along other paths, such as linear, triangular wave, serpentine, etc. (not shown). It is also preferred that the scoring flanges 32 of the first and second heating plates 14, 22 are aligned (i.e., one on top of the other) with each other in the closed position. Alignment of the scoring flanges 32 in the closed position permits the waffle product 12 produced from the waffle baker grill 10 to be divided into a plurality of waffle sticks 12a–12f (see FIG. 4) along score lines 34a–34d, 34a'–34d' created by the scoring flanges 32. The score lines 34a–34d, 34a'–34d' have the same sine-wave shape of the scoring flanges 32. The sine-wave shape of the score lines 34a–34d, 34a'–34d' provide an aesthetically pleasing waffle product 12.

Referring now to FIGS. 1 and 3–5, in the preferred embodiment, the waffle baker grill 10 includes two scoring flanges 32 within each of the first, second, third and fourth cavities 20a, 20b, 30a and 30b. In this configuration, the waffle product 12 produced from the waffle baker grill 10 is separable into a pair of sub-waffles 12g, 12h along dividing lines 12i, 12i' created by the first and second protrusions 18, 28 and six waffle sticks 12a–12f separable along the score lines 34a–34d' and the dividing lines 12i, 12i'. The waffle baker grill 10 is not limited to the above-described configuration of a pair of sub-waffles 12g, 12h and six waffle sticks 12a–12f. The first and second heating plates 14, 22 may be configured with nearly any number of protrusions and scoring flanges to produce a waffle product 12 divisible into nearly any number of sub-waffles or waffle sticks by hand by dividing the waffle product 12 along a plurality of dividing lines and scoring lines. The number of sub-waffles 12g, 12h or waffle sticks 12a–12f is only limited by the size of the waffle baker grill 10 and the preferences of a user. For example, the waffle baker grill 10 may be doubled in size to produce a waffle product 12 comprised of four sub-waffles and twelve waffle sticks (not shown) by extending the heating plates 14, 22 from each of the second side 16b and the fourth side 24b that mirror the first and second heating plates 14, 22, shown in FIG. 1 and by expanding the size of the first and second housing sections 26a, 26b.

The first and second heating plates 14, 22 further include a plurality of mounds 36 extending from the first and second surfaces 14a, 22a to a distance less than the predetermined distance in the preferred embodiment. The mounds 36 are dispersed about the first and second surfaces 14a, 22a and create wells 38 in the waffle product 12 produced by the waffle baker grill 10 that may be used for retaining condiments disposed onto the waffle product 12. The mounds 36 and wells 38 are generally well known in the waffle baker art and are generally preferred by consumers of waffle bakers. The mounds 36 and wells 38 of the waffle baker grill 10 have a generally non-symmetrical shape when compared to conventional waffle maker mounds and/or wells (not shown). The non-symmetrical shape of the mounds 36 and wells 38 results from the preferred, sine-wave shape of the scoring flanges 32.

It is preferred that the mounds 35, first and second protrusions 18, 28, scoring flanges 32 and walls 16a, 16b, 24a, 24b of the first and second heating plates 14, 22 include a draft angle A that permits opening of the waffle baker grill 10 without tearing the waffle 12 at the conclusion of a waffle baking cycle. In the preferred embodiment, the draft angle A is approximately 20–27 degrees. Waffle grills 14, 22 configured with the hinges 23 as shown in FIG. 1 and with draft angles A less than 20 degrees, have a tendency to tear the waffle 12 when opening the grills 14, 22 after a baking cycle. The waffle 12 may tear when a sweeping movement of the above-listed components of the waffle baker 10 come into contact with the waffle 12 due to the rotational movement of the first and second heating plates 14, 22 during opening. The tearing occurs when the sweeping movement extends into the cooked waffle 12 a sufficient distance to tear portions of the waffle 12. One having ordinary skill in the art will realize that the waffle baker grill 10 is not limited to he above-identified draft angles A. Smaller draft angles A may be utilized with specific waffles 12 that are relatively elastic and resistant to tearing or with waffle baker grills that are configured to have small sweeping movements during opening or do not open in a sweeping movement at all. In addition, larger than the preferred draft angles A may be utilized, however, larger draft angles A reduce the volume of the waffle 12. Accordingly, the 20–27 degree draft angle A is preferred for the waffle baker grill 12 of the preferred embodiment using the most common batters and to maximize the volume of the waffle 12.

Referring specifically to FIGS. 1 and 3, it is preferred that first and second heating plates 14, 22 further include outer walls 14b, 22b that extend around a periphery of the heating plates 14, 22 and are separated from the sides 16a, 16b, 24a, 24b by a first trough 14c and a second trough 22c. In the closed position, the outer walls 14b, 22b of the first and second heating plates 14, 22 are aligned and in facing engagement with each other, which aligns each of the above-listed opposing features of the first and second heating plates 14, 22. Also in the closed position, it is preferred that the fist and second peripheral walls 16, 24, first and second protrusions 18, 28, scoring flanges 32 and mounds 36 of the first and second heating plates 14, 22 do not come into contact or facing engagement. Preferably, in the closed position, a space between the first and second peripheral walls 16, 24 and first and second protrusions 18, 28 is approximately one millimeter and a space between the mounds 36 and scoring flanges 32 is approximately two millimeters. Designing the first and second heating plates 14, 22 to have spaces between the above-listed opposing features encourages flow of batter (not shown) throughout the first and second cavities 20a, 20b between the plates 14, 22 during cooking of a waffle 12. One having ordinary skill in the art will realize that the above listed dimensions are not limiting. For example, the above-listed features of the first and second heating plates 14, 22 may come into facing engagement in the closed position and flow of batter within the cavities 20a, 20b may occur when the batter expands during cooking, thereby urging the above-listed components out of facing engagement and permitting batter flow.

Referring now to FIGS. 1–3, as mentioned above, the first and second heating plates 14, 22 are secured to the first and second housing sections 26a, 26b. The first and second housing sections 26a, 26b accommodate insulation (not shown), control components 26c (partially shown) and heating elements 50 and support the first and second heating plates 14, 22. The first and second housing sections 26a, 26b also form a handle 26d that may be employed to transport the waffle baker grill 10 or move the second heating plate 22 relative to the first heating plate 14. An electric cord 26e (partially shown) powers the waffle baker grill 10 as is well understood by those of ordinary skill in the art. Alternatively, the first and second heating plates 14, 22 may be readily removable by a user from the first and second housing sections 26a, 26b (not shown). Removability of the first and second heating plates 14, 22 from the first and second housing sections 26a, 26b is advantageous to a user for cleaning the first and second heating plates 14, 22. The structure of the first and second housing sections 26a, 26b, insulation, control components, heating elements 50 and removability of the first and second heating plates 14, 22 is well understood by those of ordinary skill in the art and is not pertinent to the present invention. Accordingly, further description thereof is omitted for purposes of convenience only and is not limiting.

Referring now to FIGS. 4–5, the present invention is also directed to the waffle product 12 produced from disposing batter (not shown) between the first and second heating plates 14, 22 and heating the batter for a predetermined amount of time. The waffle product 12 includes a body of the cooked batter having a first edge 40, a second edge 42, a first waffle surface 44, a second waffle surface 46 and a predetermined thickness T measured between the first and second waffle surfaces 44, 46. It is preferred that the predetermined thickness T be between ten millimeters for regular waffles up to approximately twenty-eight millimeters for Belgian-type waffles. The waffle baker grill 10 is not limited to the above-listed predetermined thickness T range and may take on any thickness that allows thorough baking of the waffle product 12 and consumption by a user. In the preferred embodiment, the waffle product 12 further includes a plurality of wells 38 each preferably having a depth less than half the predetermined thickness T. Preferably, the wells 38 are used for retaining condiments disposed onto one of the first and second waffle surfaces 44, 46. As discussed above, the wells 38 are not required in the production of waffle products but are generally preferred by users.

The preferred waffle product 12 of the present invention is divisible by hand into two sub-waffles 12g, 12h along the dividing lines 12i, 12i', which each have a depth less than half the predetermined thickness T. In the preferred embodiment, the dividing lines 12i, 12i' traverse the first and second waffle surfaces 44, 46 from the first edge 40 to the second edge 42 along a path that is generally perpendicular to the first and second edges 40, 42. The dividing line 12i on the first waffle surface 44 is generally aligned with the dividing line 12$i'$ on the second waffle surface 46 such that waffle product 12 may be divided into the sub-waffles 12$g$, 12$h$ along the dividing lines 12$i$, 12$i'$. The sub-waffles 12$g$, 12$h$ further include a plurality of scoring lines 34$a$–34$d$, 34$a'$–34$d'$ each having a depth less than half the predetermined thickness T traversing the first and second waffle surfaces 44, 46 from the first edge 40 to the second edge 42. The scoring lines 34$a$–34$d$ on the first waffle surface 44 are generally aligned with the scoring lines 34$a'$–34$d'$ on the second waffle surface 46 such that each sub-waffle 12$g$, 12$h$ is separable by hand into a plurality of waffle sticks 12$a$–12$i$ along the scoring lines 34$a$–34$d$, 34$a'$–34$d'$.

One having ordinary skill in the art will realize that the waffle product 12 is not limited to a specific number of dividing lines and scoring lines. The number of dividing lines 12$i$, 12$i'$ and scoring lines 34$a$–34$d$, 34$a'$–34$d'$ shown in FIGS. 4 and 5 are shown for convenience only. The number of dividing lines 12$i$, 12$i'$ and scoring lines 34$a$–34$d$, 34$a'$–34$d'$ may be determined by a user depending upon a predetermined, preferred sub-waffle 12$g$, 12$h$ and waffle stick 12$a$–12$f$ size and/or capacity of the waffle baker grill 10. In addition, one having ordinary skill in the art will realize that the waffle product 12 is not limited to configurations including dividing lines 12$i$, 12$i'$. The dividing lines 12$i$, 12$i'$ may be omitted from the waffle product 12 or may be replaced by a pair of opposing scoring lines (not shown). The dividing lines 12$i$, 12$i'$ are provided to permit separation of the waffle product 12 by hand into the sub-waffles 12$g$, 12$h$ for consumption by a user.

In the preferred embodiment, the waffle product 12 includes the opposing dividing lines 12$i$, 12$i'$, which have a depth less than half the predetermined thickness T traversing the first and second waffle surfaces 44, 46 from a generally central position of the first edge 40 to a generally central position of the second edge 42. The waffle product 12 is separable by hand into the pair of sub-waffles 12$g$, 12$h$ along the dividing lines 12$i$, 12$i'$ and the plurality of waffle sticks 12$a$–12$f$ along the dividing lines 12$i$, 12$i'$ and scoring lines 34$a$–34$d$, 34$a'$–34$d'$. The pair of dividing lines 12$i$, 12$i'$ shown in the preferred embodiment of the waffle product 12 are for convenience only. For example, the waffle product 12 may be separable by hand into three or more sub-waffles (not shown) along a plurality of dividing lines (not shown) that traverse the first and second waffle surfaces 44, 46 at opposing aligned positions. Further, the dividing lines 12$i$, 12$i'$ may be omitted in which case the waffle product 12 would include only scoring lines 34$a$–34$d$, 34$a'$–34$d'$ on the first and second waffle surfaces 44, 46. In addition, the dividing lines 12$i$, 12$i'$ and scoring lines 34$a$–34$d$, 34$a'$–34$d'$ are not necessarily limited to a depth less than half the predetermined thickness T of the waffle product 12. For example, the dividing lines 12$i$, 12$i'$ and scoring lines 34$a$–34$d$, 34$a'$–34$d'$ may have a depth that is somewhere between half the predetermined thickness T and the predetermined thickness T as long as the dividing lines 12$i$, 12$i'$ and scoring lines 34$a$–34$d$, 34$a'$–34$d'$ are not opposed and aligned on the waffle product 12. A first scoring line 34$a$ may extend to nearly the predetermined thickness T from the first waffle surface 44, a first dividing line may extend from the second waffle surface 46 adjacent the first scoring line and a second scoring line may extend from the first waffle surface 44 adjacent the first dividing line (not shown). In such an arrangement, the waffle product 12 would be divided by hand into sub-waffles 12$g$, 12$h$ along the single dividing line and four waffle sticks (not shown) along individual scoring lines and the single dividing line.

Referring to FIGS. 4 and 5, in the preferred embodiment, the scoring lines 34$a$–34$d$, 34$a'$–34$d'$ have a generally sine-wave shape that traverses the first and second waffle surfaces 44, 46. The scoring lines 34$a$–34$d$, 34$a'$–34$d'$ are not limited to sine-wave shapes and may be comprised of nearly any shape which extends from the first edge 40 to the second edge 42 and permits division by hand of the waffle product 12 into individual waffle sticks 12$a$–12$f$. The sine-wave shape of the scoring lines 34$a$–34$d$, 34$a'$–34$d'$ has a generally aesthetically pleasing appearance to consumers.

Referring to FIGS. 1–3, in operation, the waffle baker grill 10 of the present invention is positioned on a supporting surface 48 and the first and second heating plates 14, 22 are pre-heated to a predetermined temperature by powering the heating elements 50. The first and second heating plates 14, 22 are preheated to a temperature that permits baking of the batter to produce a waffle product 12. Batter of any variety, as would be known by one having ordinary skill in the art, is poured onto the first heating plate 14 when the first and second heating plates 14, 22 reach the predetermined temperature. The batter flows along the first surface 14$a$ and is contained within the first and second cavities 20$a$, 20$b$ adjacent the first surface 14$a$ by the first peripheral wall 16 and first protrusion 18. Extra batter that may overflow from the first peripheral wall 16 is generally captured in the trough 14$c$. The second heating plate 22 is then positioned relative to the first heating plate 14 in the closed position. In the closed position, the batter is cooked from either side by the first and second heating plates 14, 22 and begins to rise and expand urging the first and second heating plates 14, 22 away from each other. If the hinges 23 are designed to permit movement of the second heating plate 22 generally linearly away from the first heating plate 14 such that the first and second surfaces 14$a$, 22$a$ are generally parallel to each other during batter expansion, the waffle product 12 should have generally parallel first and second waffle surfaces 44, 46. Conversely, if the hinges 23 only permit pivotal movement of the first heating plate 14 relative to the second heating plate 22, the first and second waffle surfaces 44, 46 will likely be pitched relative to each other at the conclusion of a baking cycle.

The second heating plate 22 is pivoted to the open position after the batter has been cooked for the predetermined amount of time such that the batter is transformed into a waffle product 12 having a desired consistency. Because of the configuration of the first and second heating plates 14, 22 including the first and second peripheral walls 16, 24, first and second protrusions 18, 28 and scoring flanges 32, the waffle product 12 includes the scoring lines 34$a$–34$d$, 34$a'$–34$d'$ and the dividing lines 12$i$, 12$i'$ on the first and second waffle surfaces 44, 46. The cooked waffle product 12 is then removed from the first heating plate 14 and displaced onto a serving tray (not shown). For example, the waffle product 12 may be grasped by a fork or tongs, removed from the waffle baker grill 10 and disposed onto the serving tray for consumption by a user.

The waffle product 12 may be divided by hand along the dividing lines 12$i$, 12$i'$ into the pair of sub-waffles 12$g$, 12$h$ for serving as individual sub-waffles 12$g$, 12$h$. The sub-waffles 12$g$, 12$h$ are generally positioned on the serving tray, exposed to a condiment that is dispersed into the wells 38 and divided into bite-size slices using eating utensils. Alternatively, the cooked waffle product 12 may be divided by hand along the scoring lines 34$a$–34$d$, 34$a'$–34$d'$ and dividing lines 12$i$, 12$i'$ into the plurality of waffle sticks 12$a$–12$f$. The waffle sticks 12$a$–12$f$ are generally consumed by hand and may be conveniently dipped into a condiment and consumed. For example, the waffle sticks 12a–12f may be dipped into maple syrup, jam, chocolate or sugar to provide extra flavor to the waffle sticks 12a–12f.

It will be appreciated by those skilled in the art that changes could be made to the embodiments described above without parting from the broad inventive concept thereof. For instance, the scoring lines 34a–34d, 34a'–34d' may extend from the first and second surfaces 14a, 22a to a distance greater than the predetermined distance (not shown) if the scoring lines 34a–34d, 34a'–34d' and dividing lines 12i, 12i' are offset from opposing scoring lines 34a–34d, 34a'–34d' and dividing lines 12i, 12i'. Such a configuration would create non-opposing or non-aligned scoring lines and dividing lines in the waffle product 12 that would permit a user to divide the waffle product by hand into any number of sub-waffles and/or waffle sticks. It is understood, therefore, that this invention is not limited to the particular embodiments disclosed, but is intended to cover modifications within the spirit and scope of the present invention as defined by the appended claims.

We claim:

1. A waffle baker grill for producing a waffle comprising:
a first heating plate having a first surface and a first peripheral wall extending from the first surface to a predetermined distance, the first peripheral wall including at least a first side and a second side;
a second heating plate having a second surface and a second peripheral wall extending from the second surface to the predetermined distance, the second peripheral wall including at least a third side and a fourth side, the second heating plate being pivotally connected to the first heating plate to move between a closed position wherein the first and second peripheral walls are adjacent to each other and an open position wherein the first and second peripheral walls are spaced from each other; and
at least one scoring flange extending from each of the first and second surfaces to a distance less than the predetermined distance between the first and the second sides and the third and fourth sides, respectively, wherein the waffle produced from the grill may be divided into a plurality of waffle sticks along score lines created by the scoring flanges.

2. The waffle baker grill of claim 1 further comprising:
a first protrusion extending from the first surface to the predetermined distance between the first and second sides, the first protrusion creating first and second cavities between the first protrusion and the first peripheral wall; and
a second protrusion extending from the second surface to the predetermined distance between the third and fourth sides, the second protrusion creating third and fourth cavities between the second protrusion and the second peripheral wall.

3. The waffle baker grill of claim 2 wherein the first protrusion extends generally perpendicularly between the first and second sides and the second protrusion extends generally perpendicularly between the third and fourth sides.

4. The waffle baker grill of claim 3 wherein two scoring flanges are positioned within each of the first, second, third and fourth cavities, the waffle produced from the grill being separable into a pair of sub-waffles along a dividing line created by the first and second protrusions and six waffle sticks along the score lines and the dividing line.

5. The waffle baker grill of claim 1 further comprising:
a plurality of mounds extending from the first and second surfaces to a distance less than the predetermined distance, the mounds dispersed about the first and second surfaces and creating wells in the waffle produced by the grill that may be used for retaining ingredients disposed onto the waffle.

6. The waffle baker grill of claim 1 wherein the scoring flanges traverse the first and second surfaces along a sine-wave shaped path.

7. The waffle baker grill of claim 1 wherein the first and second heating plates are in the closed position, the scoring flanges of the first and second heating plates are aligned with each other and the waffle produced from the grill being separable into a plurality of waffle sticks along scoring lines created by the scoring flanges.

* * * * *